UNITED STATES PATENT OFFICE 2,170,065

MAKING CARBONACEOUS ZEOLITES

Ray Riley, Long Island City, N. Y., assignor to The Permutit Company, New York, N. Y., a corporation of Delaware No Drawing. Application November 9, 1935, Serial No. 49,116

7 Claims. (Cl. 252—2)

This invention relates to making carbonaceous zeolites, and it comprises a method wherein lignite and materials of a like humic nature are treated with diluted sulfuric acid of sufficient strength and at a sufficient temperature to produce chemical and physical changes therein, heating being often continued under evaporative conditions until the sulfuric acid becomes sufficiently concentrated to produce sulfonation and oxidation; all as more fully hereinafter set forth and as claimed.

Materials of the nature of lignite, humus, peat, brown coal, etc., are able to function as ion exchange bodies and as water softeners. After use, they can be regenerated with a solution of common salt and again used in another cycle of water softening. In these properties they are analogous to the ordinary inorganic zeolites and to glauconite, much used in softening water. As substitutes for inorganic zeolites, they have some advantages and some disadvantages. All these materials will not only exchange Na for Ca, becoming a sodium or a calcium zeolite, as the case may be, but will also extract cations from a saline solution and can be regenerated with acid to form a "hydrogen zeolite". For some uses, it is advantageous to be able to extract cations from water without putting another corresponding soluble cation in solution; in boiler waters, for example, it is sometimes advantageous to remove Ca from the water without replacing it by Na. By the use of a hydrogen zeolite, water can be softened with a decrease in its solids content and a development of acidity. For use in cation extraction, the humic materials are better than the silicate zeolites in that they are more resistant to acid regeneration. In addition, they may be given a high capacity or power for ion-exchange.

While ion-exchange and cation removal properties are exhibited by humic bodies mentioned above, they are not all equally suitable for practical use. A number of physical characteristics are quite as important as the exchange power. The material must ordinarily be in the form of hard, rugged and rigid granules. The granules must be hard enough and rigid enough to fit them for use as a pervious bed which may be of considerable depth. Two methods of water softening are in general use, upflow and downflow. In the former, the granules are used as a pervious bed which is occasionally backwashed and classified, while in upflow, they are used as a more or less expanded body. In either case, a considerable amount of mechanical strength is necessary. From a physical point of view, the various lignites and brown coals are better than other varieties of humic substances such as peat. Some of the soft coals are mechanically very good, but their exchange power is often less than that of the lignites. The natural carbonaceous substance having some ion-exchange power may be regarded as forming a series, beginning with peat and ending with hard coal. The lignites are the most generally available materials and they have good exchange power per pound or per cubic foot. But most of them, as mined or quarried, are hydrated materials that need some pre-preparation for use in a softener. South Dakota lignites, which tend to shatter in the air, are often steam cured before being put on the market, the steam cure being attended with a certain amount of dehydration.

I have found that with all these humic acid materials, and particularly with lignite, great betterment in both the chemical and physical properties is effected by heating the material with sulfuric acid of a medium concentration. Below a strength of, perhaps, 5 per cent, sulfuric acid merely makes a hydrogen zeolite. In greater strengths, up to, say, 70 per cent, it exercises a number of actions without either sulfonating or oxidizing. These actions are probably of the nature of dehydration and polymerization. In any event, I have found that by heating these lignites and other humic materials with medium strength sulfuric acid for approximately an hour, sometimes more, sometimes less, the granulated material is rendered physically much more resistant and durable in use, while its exchange and cation extracting powers are improved. While I have spoken of medium strength acid, meaning thereby diluted acid containing 50 to 70 per cent real $H_2SO_4$, it is much more convenient to start with a more dilute acid to secure uniform impregnation. In so doing, it is easier to secure even distribution of a given amount of actual $H_2SO_4$. After impregnation by heating under evaporative conditions, higher concentrations of acid result. In some cases, using relatively small proportions of actual $H_2SO_4$, quite dilute acid is used in amount sufficient to make a moist mass, this being allowed to stand for a time to permit uniform diffusion. Afterwards, the mass is heated sufficiently to evaporate off the excess water and leave an open textured mass. This gives an opportunity for air oxygen to exert an action and this is sometimes useful.

With the use of sulfuric acid above about 70 per cent strength and at a high temperature, substantial chemical alterations are effected in the lignite; and it is oxidized to some extent with formation of $SO_2$ and sulfated or sulfonated bodies are formed. These results are obtained more quickly with even stronger acid and sulfur trioxid itself may be used. But there is a mechanical difficulty in securing even distribution of a small amount of acid in a mass of lignite or the like and, as a result, wasteful proportions of acid are ordinarily employed; much of the acid used goes through the operation unchanged and it is difficult to recover clean acid economically.

I have found that I can secure betterment in treating lignite and the like with medium strength sulfuric acid, giving me a stronger and more rugged material, and I can afterwards sulfate this altered lignite by continuing the heating with removal of water by evaporation. This enables the production of sulfated lignites with a minimum use of acid and with a bettered product.

In acting upon lignite with sulfuric acid, the time and temperature of heating should be longer and higher, respectively, with lower concentrations of acid. Where I do not wish to sulfate or oxidize the lignite, I stop the operation before the sulfuric acid becomes hot enough and strong enough to give an evolution of $SO_2$ vapors.

The amount of actual sulfuric acid required per pound of lignite or coal in the present invention is not great; rarely more than 2 pounds. It is frequently much less but not less than 0.5 pound. In treatment without sulfating, practically the full amount of acid can be, and is, afterwards withdrawn by treatment with water. The recovered acid is in general discolored. At the end of the heating and evaporating operation, the acid in the material is often around 70 per cent strength; i. e., it contains 70 pounds actual $H_2SO_4$ per hundred. In recovering it, however, it is usually somewhat diluted by the wash water.

In a specific embodiment of the present invention, I used granulated, commercial steam treated South Dakota lignite of a suitable granule size, between 14 and 40 mesh. With this granular material, I admixed diluted sulfuric acid, using about 120 pounds of 40 per cent acid per cubic foot of the granular material. In this particular case, the amount of actual $H_2SO_4$ per pound of lignite on a dry basis was about 1.2 pounds. The lignite contained about 15 per cent of water as determined by drying at 105° C. and a cubic foot of the granules weighed, on a dry basis, about 40 pounds. The wet mass was next heated under evaporative conditions, so as to produce a slow formation and release of water vapor, this being carried on until the acid in the material reached about 70 per cent strength. At this point, heating was stopped and the acid washed out, giving me a lignite of about the original chemical character but bettered in physical strength and exchange properties. The washed, somewhat dried material could be used directly for ion exchange and for cation extraction. It is, however, convenient practice, which was followed in this instance, to give the acid washed material a pretreatment before employing it for water softening by ion exchange. The somewhat acid material was neutralized with lime water and then treated to charge it with exchangeable sodium; this being done by treating with a solution of common salt and washing.

After being charged with exchangeable sodium, it is ready for use in the regular process of softening water by ion exchange, being alternately used to remove hardness from water and regenerated by brine.

Some of the material was used for extracting cations from water; a purpose to which it was directly applicable. In this use, regeneration was effected at intervals by a 1 to 3 per cent solution of sulfuric acid or hydrochloric acid.

If the sulfated type of product is required, instead of interrupting the operation when the contained acid reaches a strength around 70 per cent, evaporation of the water is continued until sulfating occurs; until $SO_2$ is evolved, sulfonic acid bodies are formed, etc., and continuing evaporation to apparent dryness. With variations in the amount of actual $H_2SO_4$ per pound of material, somewhat different products result. In sulfating, the product contains added sulfur, as $SO_3$, whereas if the operation be stopped short of sulfation, the sulfur content of the treated lignite is not materially greater than that of the raw material.

In this embodiment of my invention, a wide variety of materials may be used with production of good and useful ion exchange. I have obtained good results with materials as far apart as wood and wood charcoal. Either, on impregnation with weak acid and heating, first to concentrate the acid and then to give sulfating action, gives products of good base exchange properties. There are various kinds of charcoal, some being more completely carbonized than others, but all containing some volatile matter. What is known as "charbon roux" contains large amounts of volatiles.

What I claim is:

1. A process of improving material of the class consisting of lignites and soft coals for purposes of ion-exchange comprising impregnating a granular mass of said material with a weight of sulfuric acid, calculated on the basis of 100% acid, at least substantially equal to the weight of said material, said acid being diluted to a concentration of less than 70%, heating said impregnated material to concentrate the acid and produce chemical action on organic compounds in said material so that the ion-exchange properties thereof are improved, and washing residual acid from the material to preserve said properties.

2. The process of claim 1 wherein heating is stopped before oxidative and sulfating changes occur by concentration of the acid above 70 per cent strength, residual acid being removed by washing.

3. The process of claim 1 wherein heating is continued until and after $SO_2$ is evolved and oxidative and sulfating changes occur, and washing and drying the changed material to remove residual acid.

4. A process which consists in mixing lignite in granular form with a weight cf sulfuric acid calculated on the basis of 100% acid, at least about equal to the lignite by weight and diluted with water to a concentration less than 50 per cent, heating the mixture until the acid is concentrated to a strength of at least 70 per cent and the lignite is improved both physically and chemically for base exchange and base abstraction and thereafter washing the acid and water soluble matter from the treated material to preserve said improved properties.

5. The process of producing sulfated humic material for use in water treatment by base exchange and base extraction which consists in heating a carbonaceous humic material of the class consisting of lignite and soft coals with a weight of sulfuric acid, calculated on the basis of 100% acid, at least equal to the weight of carbonaceous material and diluted with water to a strength below 70 per cent acid, to concentrate the acid, continuing the heating until the humic material undergoes sulfonation, $SO_2$ is evolved and dryness results, and thereafter washing the material in water to remove acid and soluble matter.

6. In the manufacture of sulfated materials used in water treatment for base exchange and base extraction, the process which consists in uniformly impregnating granules of a carbonaceous humic material selected from the class consisting of lignite and soft coals with from 1 to 2 parts by weight of sulfuric acid, calculated on the basis of 100% acid, per part of carbonaceous material and diluted with water to a strength of less than 70% $H_2SO_4$ so as to effect uniform wetting, heating the impregnated granular mass until the contained sulfuric acid reaches a strength of about 70 per cent, continuing the heating after $SO_2$ fumes begin to be evolved and until sulfonation of the humic compounds in the material takes place, discontinuing the heating before the enhanced ion-exchange property of said mass is substantially impaired, and washing said mass with water.

7. A process of increasing the ion-exchange power and physical stability of coal for use in conditioning water comprising mixing granules of said coal with a weight of sulfuric acid, calculated on the basis of 100% acid, at least 50% of the coal by weight and having a concentration less than 70% to provide uniform impregnation of the coal, heating said mixture to concentrate the acid and evolve $SO_2$, discontinuing said heating before the coal is converted to elemental carbon, and washing residual acid and water soluble material out of the product obtained.

RAY RILEY.